United States Patent
Irwin, Jr. et al.

(10) Patent No.: US 10,695,681 B2
(45) Date of Patent: Jun. 30, 2020

(54) SYSTEM FOR UNLOCKING GAME PLAY DATA ON NEAR FIELD COMMUNICATIONS SYSTEM FOR UNLOCKING GAME PLAY DATA ON NEAR FIELD COMMUNICATIONS (NFC) CHIPS TO ALLOW FOR GAME PLAY ON AN ELECTRONIC COMPUTING DEVICE THAT USES THE GAME PLAY DATA

(71) Applicant: Tapcentive, Inc., San Francisco, CA (US)

(72) Inventors: Kenneth E. Irwin, Jr., Dawsonville, GA (US); David Wentker, San Francisco, CA (US)

(73) Assignee: Tapcentive, Inc., San Francisco, CA (US)

( * ) Notice: Subject to any disclaimer, the term of this patent is extended or adjusted under 35 U.S.C. 154(b) by 233 days.

(21) Appl. No.: 15/992,789

(22) Filed: May 30, 2018

(65) Prior Publication Data
US 2018/0345153 A1    Dec. 6, 2018

Related U.S. Application Data

(60) Provisional application No. 62/514,041, filed on Jun. 2, 2017.

(51) Int. Cl.
| | | |
|---|---|---|
| A63F 13/00 | (2014.01) | |
| A63F 13/95 | (2014.01) | |
| A63F 13/80 | (2014.01) | |
| H04B 5/00 | (2006.01) | |
| G06Q 20/20 | (2012.01) | |
| H04L 9/06 | (2006.01) | |
| G06Q 20/34 | (2012.01) | |
| G07F 7/08 | (2006.01) | |
| G07F 17/32 | (2006.01) | |
| H04L 9/32 | (2006.01) | |
| G06Q 20/32 | (2012.01) | |
| G07F 1/06 | (2006.01) | |
| A63F 13/71 | (2014.01) | |
| A63F 13/69 | (2014.01) | |

(52) U.S. Cl.
CPC .............. *A63F 13/95* (2014.09); *A63F 13/80* (2014.09); *G06Q 20/20* (2013.01); *G06Q 20/3278* (2013.01); *G06Q 20/352* (2013.01); *G06Q 20/35765* (2013.01); *G07F 1/06* (2013.01); *G07F 7/0893* (2013.01); *G07F 17/3248* (2013.01); *H04B 5/0031* (2013.01); *H04B 5/0056* (2013.01); *H04L 9/0618* (2013.01); *H04L 9/3242* (2013.01); *A63F 13/69* (2014.09); *A63F 13/71* (2014.09); *H04L 2209/34* (2013.01); *H04L 2209/805* (2013.01)

(58) Field of Classification Search
None
See application file for complete search history.

(56) References Cited

U.S. PATENT DOCUMENTS

| | | |
|---|---|---|
| 3,713,148 A | 1/1973 | Cardullo et al. |
| 4,384,288 A | 5/1983 | Walton |

*Primary Examiner* — Jay Trent Liddle
*Assistant Examiner* — Alex F. R. P. Rada, II
(74) *Attorney, Agent, or Firm* — Panitch Schwarze Belisario & Nadel LLP

(57) ABSTRACT

Systems and methods are provided for unlocking game play data on Near Field Communications (NFC) chips to allow for game play using the game play data on the NFC chips.

14 Claims, 9 Drawing Sheets

SYSTEM FOR UNLOCKING GAME PLAY DATA ON NEAR FIELD COMMUNICATIONS SYSTEM FOR UNLOCKING GAME PLAY DATA ON NEAR FIELD COMMUNICATIONS (NFC) CHIPS TO ALLOW FOR GAME PLAY ON AN ELECTRONIC COMPUTING DEVICE THAT USES THE GAME PLAY DATA

CROSS-REFERENCE TO RELATED APPLICATION

This application claims the benefit of U.S. Provisional Patent Application No. 62/514,041, filed Jun. 2, 2017, the disclosure of which is hereby incorporated herein by reference in its entirety.

FIELD OF THE INVENTION

The present invention is the innovation of control mechanisms for enhancing the utility of Near Field Communications (NFC) read-only protocols and systems thereby enabling hereto unknown functionality. Specifically, this innovation enables individual secure activation or disclosure of information utilizing only the NFC Data Exchange Format (NDEF) with consumer read-only devices.

BACKGROUND

Radio Frequency Identification (RFID) was first utilized during World War II with the introduction of Identify Friend of Foe (IFF) transponders and other devices. Arguably, the first ancestor of modern Near Field Communications (NFC) systems was described in U.S. Pat. No. 3,713,148 (Cardullo" et al.), which disclosed a passive radio transponder with memory that was powered by an interrogating signal. The first patent associated with the abbreviation "RFID" was U.S. Pat. No. 4,384,288 (Walton). Thus, the basic concepts of RFID and NFC have been disclosed for decades.

Despite this rich history, other than RFID chips and NFC read-only tags for mass transit, passports, hotel keys, and animal identification; RFID and NFC technology have struggled to achieve widespread acceptance with individual consumer applications. Indeed, the world RFID market value is estimated at only $8.89 billion United States Dollars (USD), circa 2014.

The NFC tags referred to are also configured with very small amounts of usable memory (e.g. 48-128 bytes). In such configurations, NFC tags essentially provide only the same static data as barcodes; however, the economies of printed barcodes more than offset any gains to be had by RFID or NFC tags.

Near Field Communication (NFC) was introduced as a new standard beginning in 2003 for short-range radio frequency communication. One portion of the standard referred to as "reader/writer mode" enables communication between powered devices such as mobile phones and non-powered or passive, electronic integrated circuits referred to in the art as "tags." The protocol defined in NFC to enable standardized data exchange in reader/writer mode is referred to as the NFC Data Exchange Format, or NDEF.

All top selling mobile phones include NFC capabilities, which enables the phones to read NFC tags. Those same mobile phones typically include a camera and associated software that enables the scanning and reading of barcodes. As previously stated, simply supporting barcode capabilities with more expensive NFC tags does not make economic sense for most businesses today.

What is needed are NFC tags with more usable memory that are combined with a system for protecting the data stored in that memory where the NFC tag does not require more expensive processing capabilities to protect the data. Equally important is the need to preserve interoperability between these NFC tags and the simple read or read-only operations supported by NFC devices, including mobile phones.

Thus, there is a need to modernize RFID or NFC tags to expand capabilities beyond what is readily possible with printed barcodes. Ideally, these expanded capabilities would enable individual chip activation, larger amounts of data and as well as access to confidential information, none of which would be possible with printed barcodes. Additionally, these expanded capabilities could optionally include dynamic data that could be only accessed after a consumer registered or paid a fee.

BRIEF SUMMARY OF THE INVENTION

Objects and advantages of the invention will be set forth in part in the following description, or may be obvious from the description, or may be learned through practice of the invention.

A number of mechanisms or systems are described that can securely enable activation or allow access to data on Near Field Communications (NFC) chips or tags where the NFC Data Exchange Format (NDEF) protocol is exclusively used by a consumer device. The secure mechanisms or systems are completely compatible with existing NDEF protocols.

Described are mechanisms, systems, and methodologies related to NFC read-only processes, enabling hitherto unknown levels of functionality, security, and flexibility. These NFC read-only mechanisms, systems, and methodologies implemented in a manner that both expands functionality while ensuring compatibility with existing regulations—e.g., ISO/IEC 14443, ISO/IEC 18092, NFC Forum specifications, etc.

In a first embodiment, a read-only NFC system is disclosed that allows for individual chip or tag activation or data access with a consumer device utilizing read-only functionality of NFC and the NFC Data Exchange Format (NDEF). This modified NDEF system having the advantage of allowing for individual chip activation or restricted data access while being compatible with relatively inexpensive, static data, NDEF compliant chips as well as more expensive, higher memory capacity, as well as dynamic chips. This disclosed activation or data unlocking being primarily enabled by encrypting a portion of the chip transmitted data with the associated decryption key being made available to the consumer's device only for approved activations or data requests. In a preferred embodiment, the transmitted ciphertext chip data is divided into multiplicities of data segments or blocks, with each segment or block encrypted with a different key. This preferred embodiment having the advantage of multiple activations or data unlocking events.

In a second embodiment, a NDEF system is disclosed that employs dynamic NFC chips to provide changing functionality and data in a read-only interface with the consumer's device. Portions of this variable or static data are transmitted as ciphertext with at least one separate encryption key. Decryption key access to this changing functionality and data is typically controlled by various "gate keeper" functions embedded in the consumer's device application or associated Internet web site. In a specific embodiment, the transmitted dynamic data includes a cleartext or ciphertext counter that advances every time the chip has been read. Among other functions, the chip counter can provide a flag defining the type of dynamic data being transmitted thereby allowing for data commutation. While dynamic output chips used in this embodiment are more expensive than their static brethren, the potential variable output greatly increases functionality and usability while still maintaining a simple read-only function requirement for the consumer device.

In a third embodiment, the NDEF system includes chips activated by a separate mechanism (e.g., retailer Point Of Sale or "POS" device at the time of sale) where after activation, the activated chips or tags still interface to the consumer's device exclusively via the NDEF protocol—i.e., read-only functionality. With separate (third party) activation, the activated NDEF transmitted data can be transmitted in cleartext or optionally ciphertext. Additionally, multiple activation events are possible with this embodiment where each activation event causes different sets of data to be unlocked and transmitted. This embodiment having the advantage of potentially the highest levels of functionality and marketability.

Described are a number of mechanisms and methodologies that provide practical details for reliably producing NFC systems that consequently offer a more reliable, secure, and dynamic platform than was previously deemed possible with the NDEF protocol.

DETAILED DESCRIPTION

Figure 1:
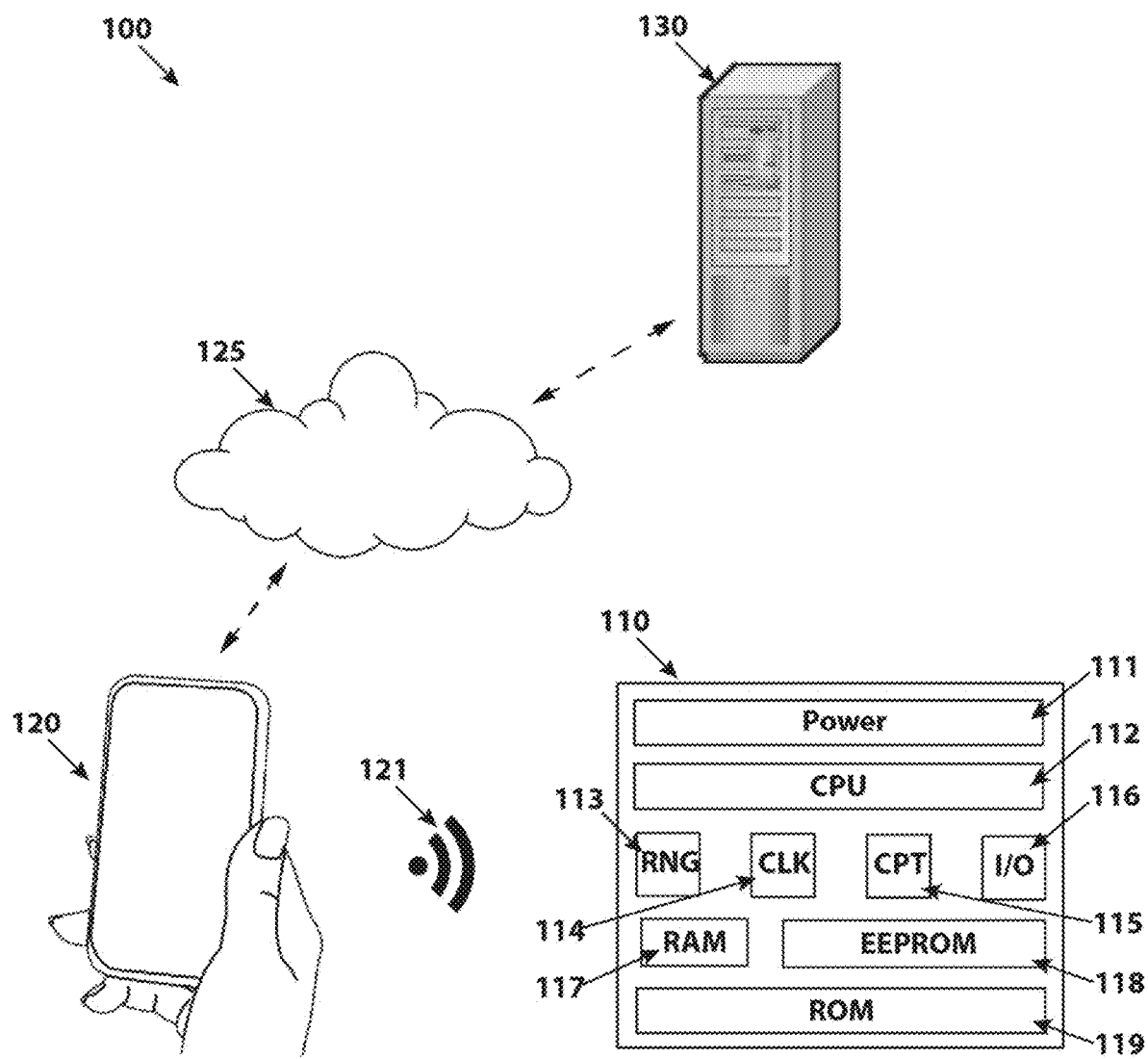
FIG. 1 is an exemplary block diagram of a prior art interface between a NFC chip communicating with a consumer's device, via a NDEF read-only protocol, with an Internet web interface.

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Certain terminology is used herein for convenience only and is not to be taken as a limitation on the present invention. The words "a" and "an", as used in the claims and in the corresponding portions of the specification, mean "at least one." In the context of this invention, discussions utilizing terms such as "providing", "receiving", "responding", "verifying", "challenging", "generating", "transmitting", or the like, often refer to the actions and processes of an electronic computing device and/or system, such as a desktop computer, notebook computer, tablet, mobile phone, and electronic personal display, among others. The electronic computing device and/or system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Also, in the context of this invention, the terms "chip" or "tag" are used interchangeably, always referring to an Integrated Circuit or "IC" that supports NFC. A "memory chip" as used in the claims and in the corresponding portions of the specification, signifies a chip or IC with read only memory (e.g., Read-Only Memory or "ROM", Electrically Erasable Programmable Read-Only Memory or "EEPROM", Flash), but no dynamic processing capabilities. A "microprocessor chip" denotes a chip or IC with processing, Random Access Memory (RAM) as well as ROM. Finally, the term "static" refers to a NDEF compatible chip where the information or data transmitted never varies throughout the life of the chip. In contrast a "dynamic" chip refers to a NDEF compatible chip where the information or data transmitted can optionally vary from one read to another.

Before describing the present invention, it may be useful to first provide a brief description of the current state of the art of NFC chips and associated interactions with consumer devices to ensure that a common lexicon is established of existing technology prior to describing the present invention. This description of the current state of the art of communications between NFC chips and consumer devices is accompanied by the prior art illustration of FIG. 1.

Applications for RFID technologies have been made uniform by the Near Field Communication International technology standard (ISO/IEC 18092) and the associated standardization work by the NFC Forum trade association. The standard has been embraced by mobile phone manufacturers resulting in the inclusion of NFC hardware in a broad range of Android, iPhone, and Windows Phone models. Phones with NFC capabilities enable access to NFC hardware by exposing APIs to applications. Thus, applications can be designed to enable consumer devices to read simple NFC memory chips as well interact with more sophisticated microprocessor chips—e.g., 110 of FIG. 1. The applications with these platforms allow for interaction between a chip and consumer device include inventory tracking, ticketing, marketing, commerce, security, Internet of Things (IoT), etc.

With reference now to FIG. 1, a block diagram of an embodiment of a typical prior art NFC system with Internet access 100 is shown. As shown in the figure, the system consists of a: NFC chip 110 (dynamic microprocessor chip as illustrated in FIG. 1), a consumer device 120 (handheld phone shown), and an optional Internet connection 125 to a central site 130. The chip 110 communications with the consumer device 121 via NFC (e.g., NDEF protocol) 121.

The prior art description's 100 NFC dynamic microprocessor chip 110 includes Power 111, a Central Processing Unit (CPU) 112, a Random Number Generator (RNG) 113, a connection for an external Clock (CLK) 114 provided by the NFC interface, a Cryptographic Coprocessor (CPT) 115, an Input/Output (I/O) port 116, RAM 117, EEPROM 118, and ROM 119. Application unique software or data can be stored and run from ROM 119 or EEPROM 118 and could, optionally, rely on the support of the RNG 113 and CPT 115 for many of the operations. In general, NFC dynamic microprocessor chip 110 (e.g., SmartMX designed by NXP) is a dedicated computer on a chip or microprocessor, embedded in a packaging with multiple physical security measures which give it a degree of tamper resistance. Although in some (more limited) applications, NFC dynamic microprocessor chip 110 may be replaced with a simpler and cheaper NFC memory chip (not shown in FIG. 1) that essentially provides read-only static data via NDEF. Regardless of the chip type, the NFC chip's I/O port 116 communications interface to the consumer device 120 is a contactless NFC interface 121 according to ISO/IEC 14443.

Thus, the NFC chip 110 in combination with the consumer device 120 communicating via NFC 121 is capable of multiple autonomous operations—e.g., serial number reading, gaming or gambling outcome, account number data transfer. Optionally, the consumer's device 120 can also contact a central site 130 via the Internet 125 thereby enabling expanded capabilities such as: inventory tracking, ticketing, marketing, commerce, security, IoT, network gaming applications, payment of prizes, etc.

Having concluded the discussion of an exemplarity prior art NFC system, preferred embodiments of the present invention will now be disclosed. As will be apparent to one skilled in the art, the present invention overcomes many of the inherent disadvantages of utilizing NFC consumer devices operating in read-only mode as well as expanding the capabilities of NFC memory chips to include chip activation or data unlocking.

Figure 2A:
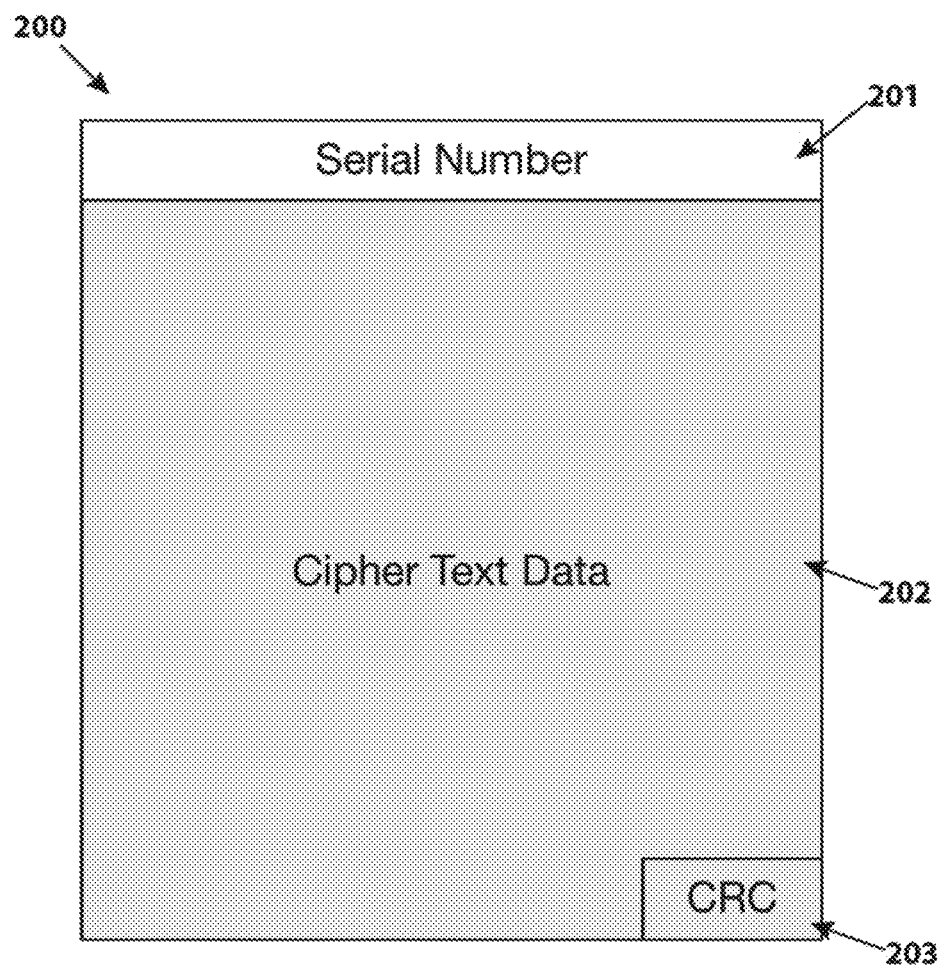
FIG. 2A is a representative schematic graphical overview of a first embodiment of data transmitted by a static NFC chip that is essentially inaccessible unless the specific chip or tag was activated on the central site system.

In a first embodiment 200 of FIG. 2A, packaged static memory chips offering only the NFC standard for allowing read-only data (NDEF) can be shipped, warehoused, and readily offered for sale within easy reach of a consumer with its transmitted data secured until the chip is sold. This embodiment being especially attractive to gaming applications (e.g., electronic scratch-off tickets) where the win or lose outcome or the way a game is played (e.g., deal of cards, Keno draw numbers) is determined by NDEF data transmitted from the NFC chip to the consumer's device and associated application or Internet web page. This modified NDEF system having the advantage of allowing for individual chip activation or restricted data access while being compatible with relatively inexpensive, static data, NDEF compliant chips (e.g., MIFARE Ultralight Nano, MIFARE Ultralight C, INNOVISION Topaz-512, MIFARE Classic) as well as more expensive, higher memory capacity, dynamic chips (e.g., NTAG216, MIFARE DESFire EV1).

This activation or data unlocking with the modified NDEF system of this invention is enabled by encrypting a portion of the NDEF transmitted data as illustrated in FIG. 2A embodiment 200. As shown in embodiment 200, the NDEF data originating from the chip is illustrated as a block of both cleartext and ciphertext data (ciphertext highlighted by gray shading) comprised of:

A cleartext header field 201 that, as a minimum, contains a unique serial number assigned to the chip transmitting the data An ancillary ciphertext data field 202 containing the locked data An optional Cyclic Redundancy Check (CRC) field 203 preferably transmitted as ciphertext Thus, whenever the NFC chip is read by a consumer or other NFC device the resulting locked ancillary data 202 portion is transmitted in an encrypted format that is essentially unusable by the recipient. However, the unencrypted cleartext header portion 201 of the transmitted data includes a serial number uniquely identifying the NFC chip that can be used as a pointer on a central site system, ultimately providing a decryption key for the locked ciphertext data 202 portion. As is apparent to one skilled in the art, to be of utility for individual activation and unlocking, the decryption key retrieved by the received serial number pointer 201 must (like the serial number) be unique throughout the entire population of NFC chips. Therefore, each NFC chip can be individually activated by supplying the consumer's device with the appropriate decryption key thereby allowing the device to gain access to the unlocked (i.e., cleartext) version of the usable data.

Theoretically, either a symmetrical or asymmetrical encryption algorithm could be used to generate the ciphertext ancillary data 202. However, as a practical matter, a symmetrical encryption algorithm is preferred for processing speed and keying simplicity—i.e., there is little desirable enhancement to be gained by maintaining an asymmetrical private and public key pair. Preferably, the symmetrical Advanced Encryption Standard (AES) operating with a 128-bit key would provide both speed and simplicity with higher key lengths being slightly less desirable since the added security against Birthday and other attacks is mostly not required for this type of application. Of course, other symmetrical encryption algorithms (e.g., Blowfish, Triple Data Encryption Standard or "3DES", One Time Pads or "OTP") and other key lengths may be more desirable in some applications.

As also illustrated in embodiment 200, there can be an optional CRC or checksum 203 included as a portion of the ciphertext data 202. The principle function of the CRC or checksum 203 being for data integrity to ensure that the correct decryption key was furnished and the resulting decrypted cleartext is in fact the intended data. The CRC or checksum 203 being desirable since for most anticipated applications (e.g., gambling or gaming) the unlocked data will be in a bit map format driving some form of virtual machine present in an application on the consumer's device or at a central site and consequently it may not be obvious to the virtual machine that the bit map data decrypted incorrectly, possibly crashing the virtual machine or producing erroneous results. This is especially true with most forms of symmetrical encryption algorithms (e.g., OTP), where an incorrect decryption key simply results in incorrect decrypted data with no indication (by design) that the decryption process was erroneous. Typically, a 32-bit CRC or checksum is preferred, though with the relative reliability of the NDEF transmission and the gross number of errors that would be theoretically possible by an erroneous decryption key, a 16-bit CRC or checksum should suffice with even an 8-bit CRC or checksum being acceptable if data memory is limited. Finally, it should be noted that while the CRC or checksum 203 is illustrated transmitted as ciphertext, it could be alternatively transmitted as cleartext with the locked data 202 remaining as ciphertext, though the CRC or checksum 203 would be still be calculated for the cleartext version of the data. However, this alternative embodiment is potentially less desirable since it is possible that the cleartext CRC or checksum may potentially reduce system security.

A commercial example of a modified NDEF system compatible with embodiment 200 could be a gaming application where the NFC chip transmits the win or lose game results or game play parameters (e.g., poker hand, Keno draw numbers) to the consumer's device. For example, a lottery could wish to offer electronic instant tickets (i.e., predetermined outcome video games that play out on a consumer's device, but are redeemable at a lottery retailer) in an attempt to attract a different demographic (e.g., younger players, "millennials") to lottery games. However, various federal and state laws (e.g., Interstate Wire Act of 1961, a.k.a. the "Federal Wire Act", the Unlawful Internet Gambling Enforcement Act or "UIGEA"), which depending on the interpretation may prohibit Internet gaming and therefore may act as a deterrent to a lottery to transmit and receive win or lose data over the Internet. Additionally, various entrenched brick and mortar institutions (e.g., lottery retailers, land based casinos, land based tribal gaming) may view any form of Internet gaming as competitive, decreasing their market share, and therefore undesirable. As such, introducing digital lottery products like electronic instant tickets where the win or lose game data is loaded from a NFC chip to a consumer's device resolves all the above problems. As far as Internet gaming is concerned, the NFC chip and its associated packaging physically embody the win and lose data (like a paper instant lottery ticket) where the NFC chips can be sold by a lottery retailer that can verify age. Additionally, with the embodiment 200, since the consumer would have to purchase the NFC chip from a lottery retailer as well as redeem any winnings at a lottery retailer just as they purchase and redeem paper tickets today, lottery retailers do not need to be concerned that this new digitally enhanced product will result in loss of game revenue as compared to online lottery games that do not involve any retail sales channel activity.

As used herein, "game play data" thus refers to game outcome data (e.g., win or lose outcomes of electronic instant tickets), or game play parameters (e.g., poker hand, Keno draw numbers) that will have a future win or lose outcome. That is, the game play data refers to game data that has an actual or potential future monetary value.

Accordingly, with embodiment 200, multiple plays may be programmed into one NFC chip thereby allowing the NFC chip to retail for a larger sum of money (e.g., $20) as a single purchase with significant play value embodied in the transmitted data. At the end of play a barcode on the NFC chip packaging or displayed on the consumer's device could be scanned by a lottery retailer's terminal and redeemed for prize payment.

Thus, in this commercial example enabled by embodiment 200, the NFC chip could be placed for sale within easy reach of the consumer without the need for expensive special packaging that shields NFC communications between the NFC chip and the consumer's device. This is possible because, while the NFC chip will respond to any consumer device interrogation, the NDEF win or lose data output is transmitted in ciphertext 202 such that the consumer is unable to "cherry pick" winning NFC chips from the set available for sale. As described in the discussions of FIGS. 3A, 3B, 4A, and 4B; the decryption key that translates the game results data ciphertext to cleartext in this example is not made available to the consumer until it can be verified that the consumer has purchased the associated NFC chip and correlated packaging. Therefore, while ciphertext data 202 (FIG. 2A) is transmitted on unsold NFC chips upon interrogation, its encrypted nature prevents illicit consumers from only selecting winning NFC chips from the pool of NFC chips on sale.

Figure 2B:
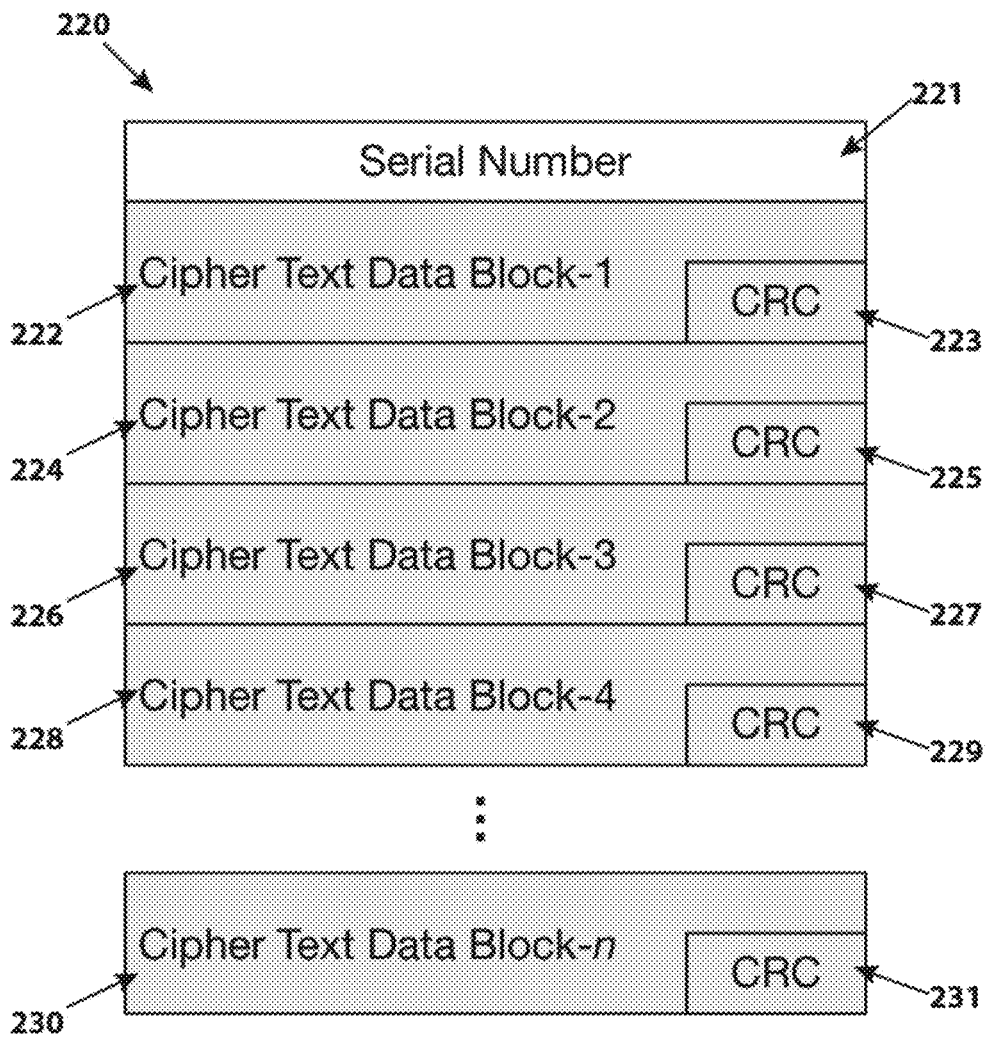
FIG. 2B is a representative schematic graphical overview of a second embodiment of data transmitted by a static NFC chip or tag where multiple segments are inaccessible unless the specific chip or tag and segment(s) were activated on the central site system.

A preferred embodiment 220 of FIG. 2B features the same general concept of embodiment 200 (FIG. 2A), where the data broadcast by the NFC chip is locked by being encrypted into ciphertext (222, 224, 226, 228, 230—FIG. 2B) until the serial number in the header 221 is received by a central site along with a correlated authorization to unlock from a device (e.g., retailer POS after payment was tendered) and the appropriate decryption key is transmitted to the consumer's device resulting in the transmitted ciphertext data becoming unlocked—i.e., cleartext. However, in the preferred embodiment of 220, rather than one homogeneous single block 202 (FIG. 2A) of ciphertext data the preferred embodiment 220 (FIG. 2B) divides the locked data into n sub-blocks (222, 224, 226, 228, 230) where each sub-block is encrypted with a separate key. Consequently, in the preferred embodiment 220 there can be multiplicities of separate activations and unlocking events for each of the n sub-blocks (222, 224, 226, 228, 230) of ciphertext, thereby multiplying the revenue potential or number of events of the NFC chip. In this embodiment 220, since each sub-block (222, 224, 226, 228, 230) of ciphertext requires a different authorization, the potential for increased sales and value is enhanced—e.g., after playing out the first sub-block 222 of ciphertext games a consumer may redeem those games for prizes won and elect to roll his or her winnings over into the purchase of the next sub-block 224 of ciphertext game data.

Of course, like the embodiment 200 of FIG. 2A, with preferred embodiment 220 of FIG. 2B, optional CRCs or checksums (223, 225, 227, 229, and 231) may be embedded in the n sub-blocks (222, 224, 226, 228, 230) of ciphertext. Again, if implemented this optional embodiment would help ensure data integrity of the unlocked deciphered cleartext data.

Figure 2C:
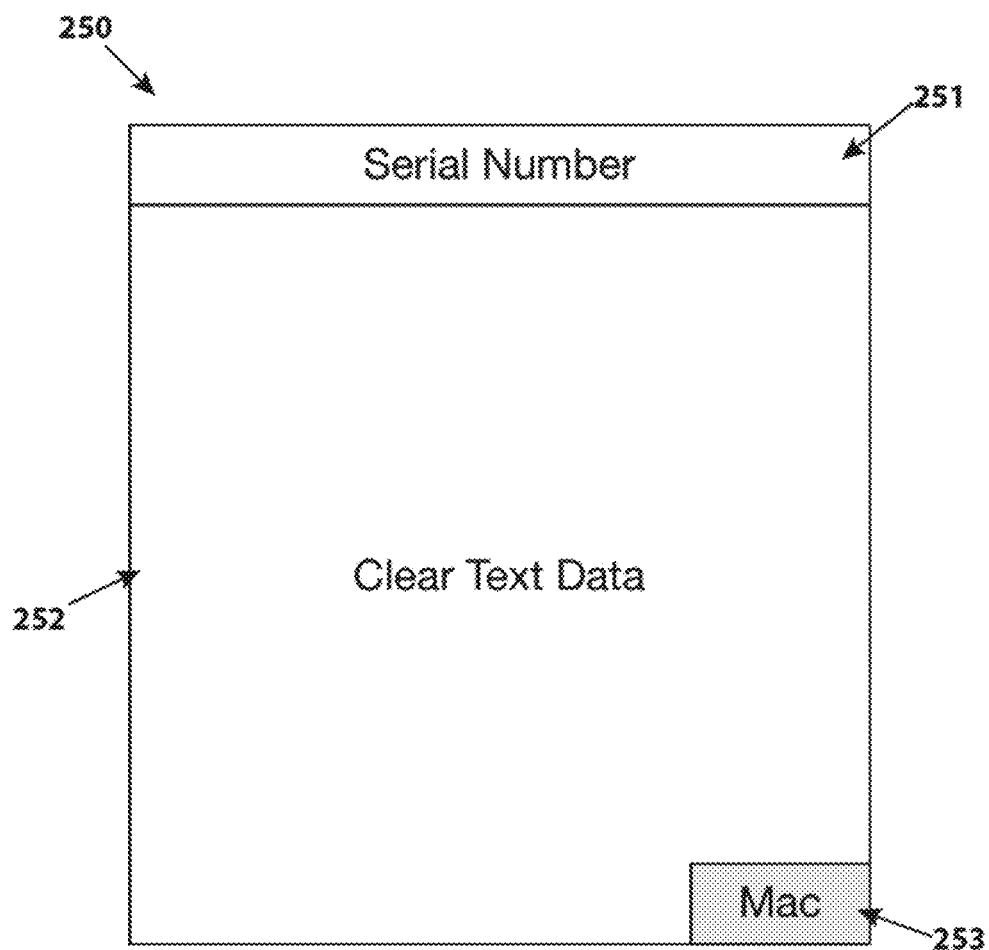
FIG. 2C is a representative schematic graphical overview of a third embodiment of data transmitted by a dynamic NFC chip where at least one segment is inaccessible unless the specific chip is activated on the central site system with a Message Authentication Code (Mac)

An alternative embodiment 250 is provided in FIG. 2C that rather than encrypting the NDEF data, transmits the data in cleartext 252 with a Message Authentication Code (Mac) 253 appended. In the context of this embodiment 220 a Mac is a short piece of data used to authenticate a message—in other words, to confirm that the message came from the stated sender (its authenticity) and has not been changed (sometimes known as a tag). The Mac 253 is generated by calculating a cryptographic hash (e.g., Secure Hash Algorithm or "SHA") of the cleartext data and encrypting the hash with a unique key associated with the NFC chip's serial number—see header 251. Preferably, for Mac generation an asymmetrical encryption algorithm is employed (e.g., IEEE P1363), with the private key assigned to the NFC chip and the public key linked to the serial number 251. Thus, the Mac value protects both the data integrity as well as its authenticity, by allowing verifiers (who also possess the secret key) to detect any changes to the message content. If a chip with dynamic processing capabilities is being employed, security could be further enhanced by dynamically generating the appended Mac 253 with each transmission of chip data thereby authenticating the chip itself. Such a chip would of course cost more than one that stores cleartext data 252 with a static Mac 253 appended.

Since, the data is transmitted in cleartext, embodiment 250 cannot be employed to unlock data or secure a NFC chip from consumer "cherry picking" of unsold chips. Rather, embodiment 220 is better suited for applications where the data itself 252 is ancillary, with the Mac proving that a given device encountered the NFC chip at (optionally) a given time. Examples of using embodiment 250 could be: digitally confirming hospital rounds, scavenger hunt type games like "Pokemon Go", and inventory control. In applications where the Mac is used to maintain a digital ledger (e.g., confirming rounds of an orderly in a hospital) the consumer reading device may append a time tag and apply a second asymmetrical encryption to the Mac using an application's private key. This second encryption would also include the time tag.

Figure 2D:
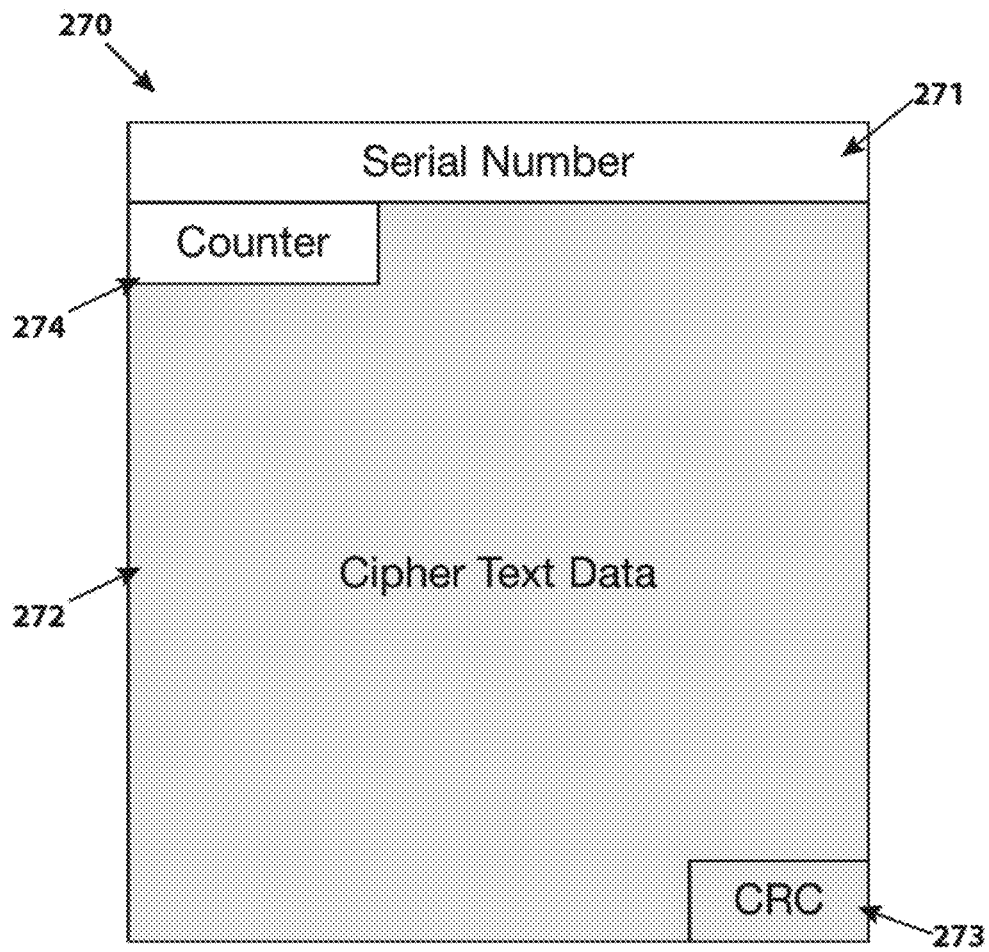
FIG. 2D is a representative schematic graphical overview of an alternative embodiment of data transmitted by a dynamic NFC chip where a counter is included in the transmitted data in accordance with embodiments of FIGS. 2A, 2B, and 2C.

In another specific embodiment 270 of FIG. 2D, like the embodiments 200 and 220 of FIGS. 2A and 2B, the NFC chip data is transmitted in ciphertext 272 (FIG. 2D); however, in this specific embodiment a cleartext (or optionally ciphertext) counter 274 is appended to the transmitted data (271, 272, and 273). The counter 274 advancing every time the chip has been read. Among other functions, the NFC chip counter 274 can provide a flag defining the type of appended dynamic ciphertext data 272 also being transmitted, thereby enabling data commutation and/or multiple key encryption. For example, there could be two different blocks of ciphertext data 272 stored in the NFC chip's memory with one block transmitted when the counter 274 is an odd number and another block transmitted when the counter 274 is an even number. Preferably, the two different blocks of ciphertext data 272 would employ different encryption keys thereby also enabling multiple activations. The counter could also be included in a dynamically generated cryptographic operation such as a Message Authentication Code or Mac which is dynamically generated with each read of the chip data and also appended to the transmitted data to confirm authenticity of the chip itself. Of course, the NFC chip compatible with embodiment 270 would have to be a more expensive, higher memory capacity, dynamic chips (e.g., NTAG216, MIFARE DESFire EV1). However, some applications may justify the higher NFC chip costs.

Figure 3A:
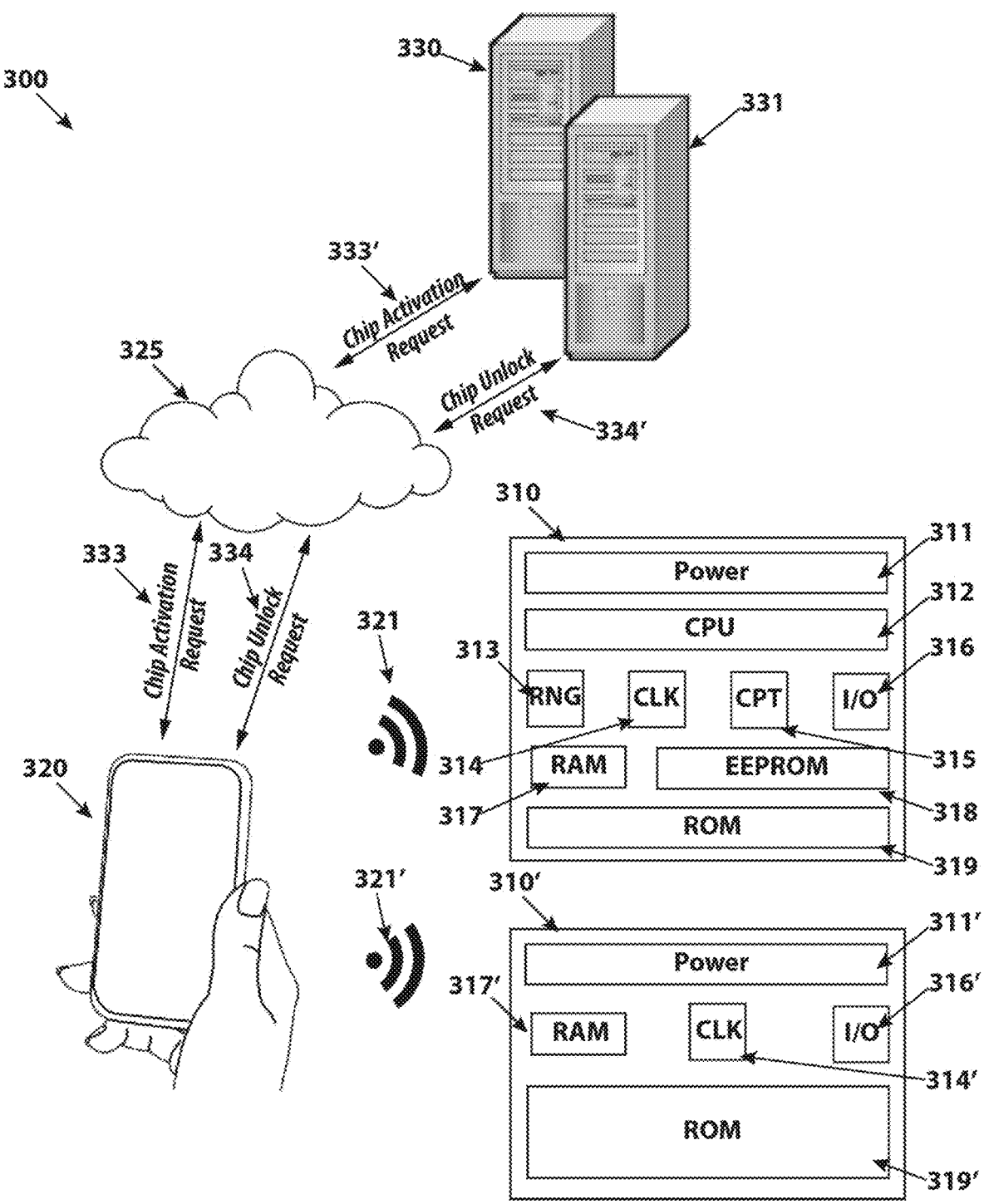
FIG. 3A is a block diagram providing a schematic graphical overview of a general embodiment system for activating or unlocking a static or dynamic NFC chip with a consumer's read-only protocol device in accordance with embodiments of FIGS. 2A through 2D.
Figure 3B:
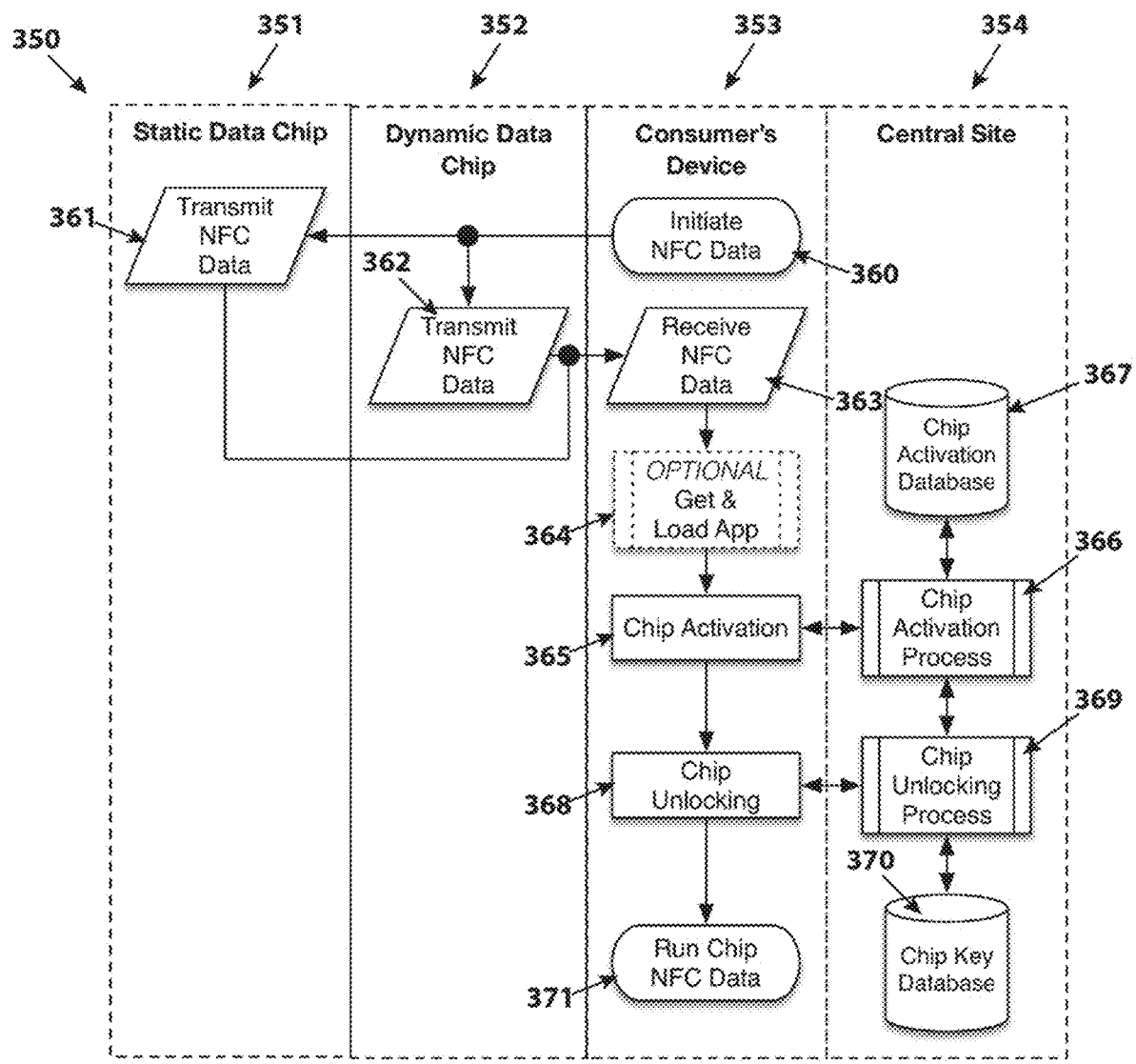
FIG. 3B is a representative example high level architecture swim lane diagram of the key components associated with activating or unlocking a static or dynamic NFC chip with a consumer's read-only protocol device in accordance with the embodiment of FIG. 3A.

FIGS. 3A and 3B taken together, illustrate a general embodiment 300 and 350 of the invention for the activation or unlocking of the ciphertext portion (e.g., 202 of FIG. 2A) of data transmitted from a NFC chip. FIG. 3A is an overall representative example block diagram of the general embodiment 300 illustrating central site servers (330 and 331), a consumer electronic computing device 320, and both dynamic-microprocessor 310 and static-memory 310' versions of NFC chips operating in NDEF protocol. FIG. 3B depicts a "swim lane" flowchart providing a schematic graphical overview 350 of the same embodiment. As illustrated in FIG. 3B, system-level functionality is conceptually divided into four groups (i.e., Static Data Chip 351, Dynamic Data Chip 352, Consumer's Device 353, and Central Site 354) by the four swim lane columns from left to right. Whichever swim lane a flowchart function appears within its functionality is limited to the data category of the associated swim lane—e.g., Chip Activation Database 367 is within the segregated domain of Central Site 354.

FIG. 3A illustrates both dynamic microprocessor 310 and static memory 310' NFC chips. The appearance of both chip types on the same figure is intended to show how either NFC chip type is compatible with the system embodiment of 300 and not an indication that two chips are required for the system to function.

System embodiment's 300 NFC dynamic microprocessor chip 310 includes: a Power 311 converter running off the NFC excitation signal, a CPU 312, a RNG 313, a connection for an external Clock (CLK) 314 provided by the NFC interface, a CPT 315, an I/O port 316, RAM 317, EEPROM 318, and ROM 319. As before, application unique software or data can be stored and run from ROM 318 or EEPROM 317 and could, optionally, rely on the support of the RNG 313 and CPT 315 for some operations. In general, NFC dynamic microprocessor chip 310 (e.g., SmartMX designed by NXP) is a dedicated computer on a chip or microprocessor, embedded in a packaging with multiple physical security measures, which give it a degree of tamper resistance.

Alternatively, NFC dynamic microprocessor chip 310 may be replaced with simpler and cheaper NFC memory chip 310' providing read-only static data via NDEF. The NFC memory chip 310' includes: a Power 311' converter, a connection for an external Clock 314', an I/O port 316', RAM 317', and ROM 319'. Of course, there are other possible configurations of NFC memory chip 310' (e.g., EEPROM included) that are also compatible, illustration 310' being simply one possible example.

Regardless of the chip type, the NFC chip's I/O port (316 or 316') communications interface to the consumer electronic computing device 320 is a contactless NFC interface (321 or 321') according to ISO/IEC 14443. When the consumer's electronic computing device 320 initially connects with either chip type (310 or 310') the excited chip transmits a portion of its NDEF memory contents (e.g., 200 of FIG. 2A) to the consumer's electronic computing device 320 (FIG. 3A). In system embodiment 300, the consumer's electronic computing device 320 extracts the chip's serial number (e.g., 201 of FIG. 2A) from the received data and appends the serial number to a chip activation request 333 (FIG. 3A) that the consumer's electronic computing device 320 sends through the Internet 325 to be received by the central site 333' where an activation server 330 can process the request. Typically, the chip activation request (333 and 333') includes other ancillary data such as payment information for unlocking game play. Assuming the ancillary data is acceptable to the activation server 330, an acknowledgement (333 and 333') is passed back to the consumer's electronic computing device 320 typically with a digital token that the consumer's electronic computing device 320 can then relay through the Internet 325 to a central site chip key server 331 as an unlock request (334 and 334'). The chip key server 331 then verifies the appended token and (assuming it is acceptable) returns the decryption key (334 and 334') to the consumer's electronic computing device 320 where the received key is used to decrypt the ciphertext (e.g., 202 of FIG. 2A) initially received from the NFC chip (310 or 310' of FIG. 3A) such that the resulting cleartext can then be read and utilized e.g., provide a game outcome, deal a poker hand, provide a Keno drawing.

Of course, there are numerous other variations of system embodiment 300 apparent to one skilled in the art—e.g., the chip activation request 333 and unlock request 334 can be combined into one message. The significant aspect being that the initial NDEF data was received and unlocked via messaging to at least one other component than the consumer's device.

As shown in system embodiment's 300 associated high level architecture swim lane diagram 350 of FIG. 3B, there are four functional components (i.e., Static Data Chip 351, Dynamic Data Chip 352, Consumer's Device 353, and Central Site 354) of the invention residing in separate devices. Swim lane diagram 350 begins with the Consumer's Device 353 being placed in close proximity to a NFC chip to provide the excitation power and query the chip for NDEF data 360. Either the Static Data Chip 351 or Dynamic Data Chip 352 replies with the requested NDEF data (361 or 362), which is received 363 by the Consumer's Device 353. At this point an application running on the Consumer's Device 353 parses the received data and begins the process of chip activation 365 or (optionally) if no appropriate application is present, the Consumer's Device 353 may automatically contact the appropriate application store on the Internet to download the required application 364.

Assuming the appropriate application is running on the Consumer's Device 353, the chip activation 365 proceeds to extract the chip's serial number (e.g., 201 of FIG. 2A) from the received NDEF data and appends the serial number to a chip activation request along with other ancillary data (e.g., payment information) that is then transmitted to the Central Site 354 (FIG. 3B). The Central Site 354 chip activation process 366 processes the ancillary data and assuming the processed results are satisfactory, logs the request in its database 367, and either passes an unlock token back to the Consumer's Device 353 or notifies the Central Site 354 chip unlocking process 369 directly. Either way, the chip unlocking process 369 eventually receives authorization to lookup the NFC chip's serial number in its database 370, extract the appropriate decryption key, and pass that decryption key to the Consumer's Device 353 chip unlocking process 368, which uses the decryption key to decrypt the received ciphertext (e.g., 202 of FIG. 2A) such that the resulting cleartext can then be read and employed by the application 371 (FIG. 3B). Of course, if the NFC chip's ciphertext data was encrypted with multiple keys (e.g., 220 of FIG. 2B), the chip activation process 365 (FIG. 3B) would also specify which ciphertext sub-block (e.g., 222, 224, 226, 228, or 230 of FIG. 2B) was to be unlocked and decrypted.

Figure 4A:
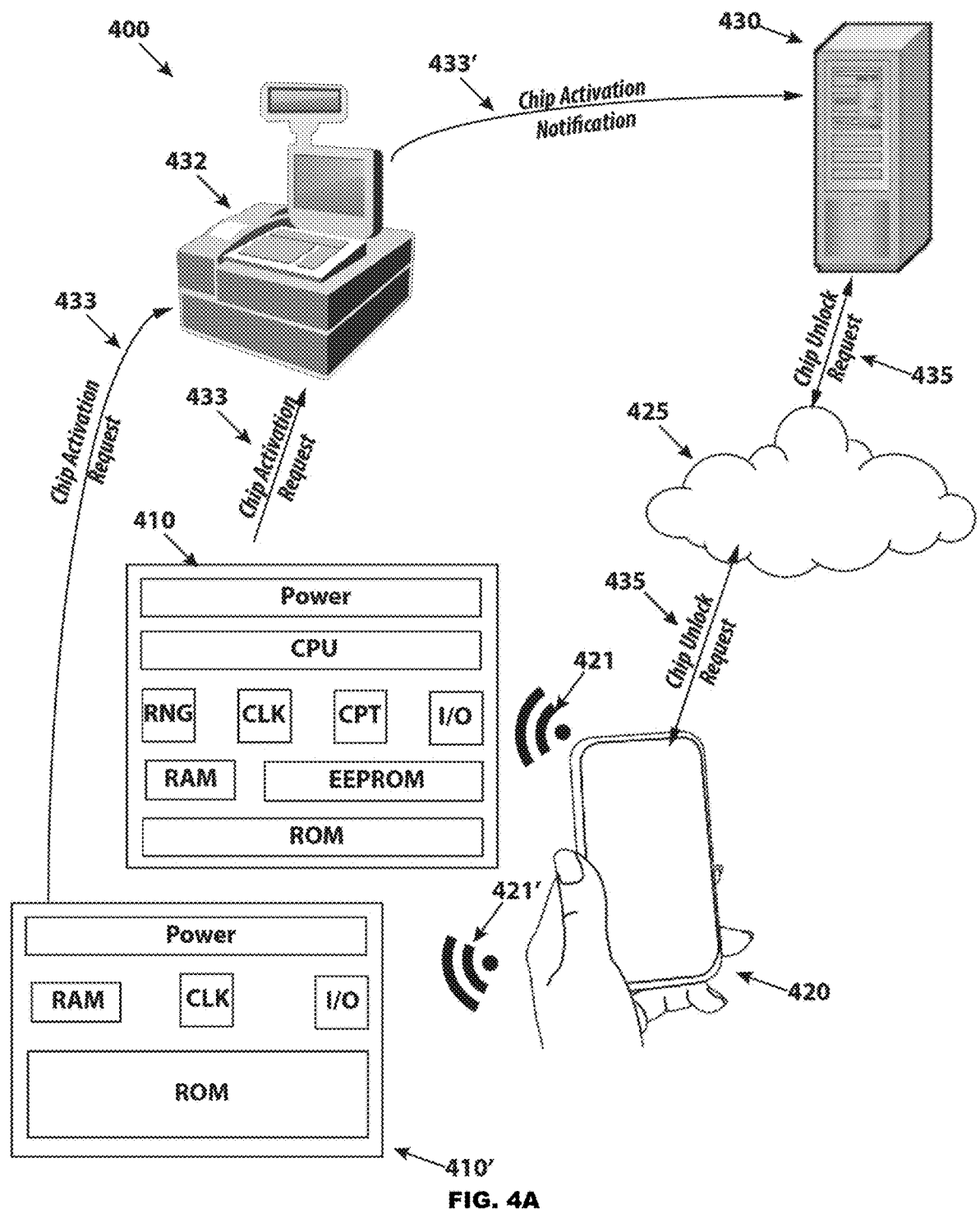
FIG. 4A is a block diagram providing a schematic graphical overview of a general embodiment system for activating or unlocking a static or dynamic NFC chip with a POS device in accordance with embodiments of FIGS. 2A through 2D.
Figure 4B:
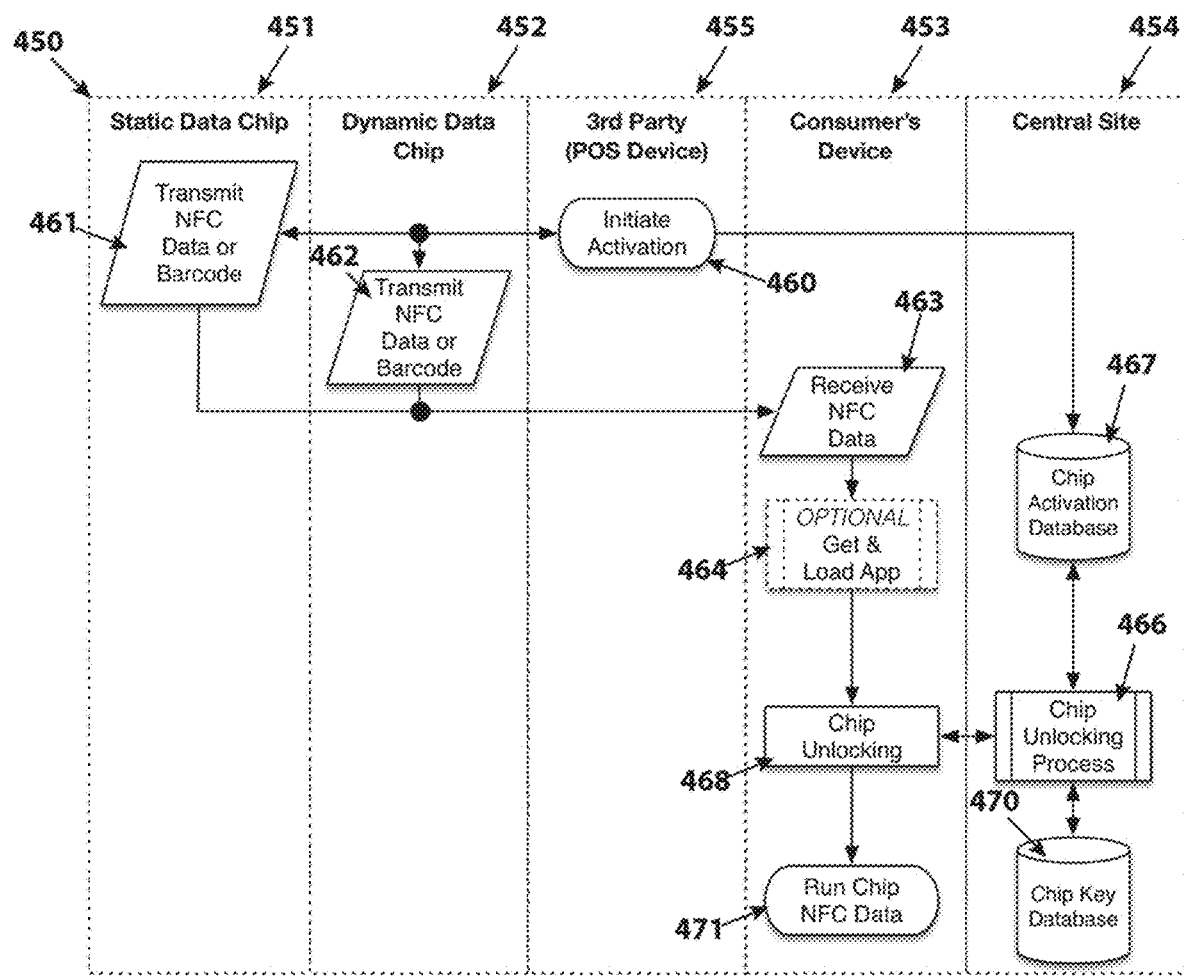
FIG. 4B is a representative example high level architecture swim lane diagram of the key components associated with activating or unlocking a static or dynamic NFC chip with a POS device in accordance with the embodiment of FIG. 3A.

The consumer activation or unlocking of NFC chip data system paradigm of FIGS. 3A and 3B can be readily expanded to enable another entity (e.g., retailer) to initiate the activation process when a specific event occurs (e.g., time of sale). FIGS. 4A and 4B provide an exemplary expanded system (400 and 450) that enables activation or unlocking to be initiated by an additional entity.

FIGS. 4A and 4B taken together, illustrate an expanded general embodiment 400 and 450 of the invention for the activation or unlocking of the ciphertext portion (e.g., 202 of FIG. 2A) of data transmitted from a NFC chip with an additional entity initiating the activation or unlocking process. FIG. 4A is an overall representative example block diagram of the expanded general embodiment 400 illustrating a central site server 430, a consumer electronic computing device 420, a retailer POS terminal 432, and both dynamic microprocessor 410 and static memory 410' versions of chips operating in NDEF protocol. FIG. 4B depicts a "swim lane" flowchart providing a schematic graphical overview 450 of the same embodiment. As illustrated in FIG. 4B, system-level functionality is conceptually divided into five groups (i.e., Static Data Chip 451, Dynamic Data Chip 452, 3$^{rd}$ Party POS Device 455, Consumer's Device 453, and Central Site 454) by the five swim lane columns from left to right. Whichever swim lane a flowchart function appears within its functionality is limited to the data category of the associated swim lane.

FIG. 4A illustrates both dynamic microprocessor 410 and static memory 410' NFC chips. As before, the appearance of both chip types on the same figure is intended to show how either NFC chip type is compatible with the system embodiment of 400 and not an indication that two chips are required for the system to function.

With expanded system 400, whenever either type of chip (410 or 410') is purchased, a chip activation request 433 is initiated by the sale process at the POS device 432. This chip activation request 433' is then forwarded (via the Internet or a private network) to a central site server 430 where the specific activation is logged. The actual type of the chip activation request 433 can vary depending on how the POS device 432 is configured.

For a POS device 432 equipped with a NFC reader, the data transmitted from a NFC chip itself can be used for the activation process. With this embodiment, the transmitted data (e.g., 200 of FIG. 2A) is received by the POS device 432 (FIG. 4A) with the chip's cleartext serial number (e.g., 201 of FIG. 2A) extracted from the data block and forwarded 433' (FIG. 4A) to the central site server 430 with the activation request that essentially informs the central site server 430 that it is allowable to pass the appropriate decryption key for this chip when queried in the future from some other device.

Alternatively, if the POS device 432 is not equipped with a NFC reader, a barcode reader could be engaged to read a barcode on the NFC chip's packaging (not shown in FIG. 4A) that embodies either the chip's cleartext serial number or preferably some proxy (e.g., keyed hash of the serial number, pointer to the serial number in a database) of the chip's serial number. As with the previous embodiment, this serial number or proxy would be forwarded 433' to the central site server 430 with the activation request that essentially informs the central site server 430 that it is allowable to pass the related decryption key for this chip when queried in the future from some other device.

The remainder of expanded embodiment 400 is essentially the same as the previous embodiment (300 of FIG. 3A). The principle difference being that the consumer's electronic computing device 420 (FIG. 4A) issues only an unlock request 435, with the activation process being already completed by the POS device 432.

After the consumer has purchased the NFC chip (410 or 410'), he or she will attempt to extract the information from the chip via NDEF protocol. Regardless of the chip type, the NFC chip's interface to the consumer electronic computing device 420 is a contactless NFC interface (421 or 421') according to ISO/IEC 14443. When the consumer's electronic computing device 420 initially connects with either chip type (410 or 410') the excited chip transmits its NDEF memory contents (e.g., 200 of FIG. 2A) to the consumer's electronic computing device 420 (FIG. 4A).

In system embodiment 400, the consumer's electronic computing device 420 extracts the chip's serial number (e.g., 201 of FIG. 2A) from the received data and appends the serial number to a chip unlock request 435 (FIG. 4A) that the consumer's electronic computing device 420 sends through the Internet 425 to the central site server 430. The central site server 430 returns the decryption key 435 to the consumer's electronic computing device 420 where the received key is used to decrypt the ciphertext (e.g., 202 of FIG. 2A) initially received from the NFC chip (410 or 410' of FIG. 4A) such that the resulting cleartext can then be read and employed by the consumer's electronic computing device 420 application—e.g., provide a game outcome, deal a poker hand, provide a Keno drawing.

As shown in system embodiment's 400 associated high level architecture swim lane diagram 450 of FIG. 4B, there are five functional components (i.e., Static Data Chip 451, Dynamic Data Chip 452, $3^{rd}$ Party POS Device 455, Consumer's Device 453, and Central Site 454) of the invention residing in separate devices. Swim lane diagram 450 begins with the $3^{rd}$ Party POS Device 455 initiating NFC chip (451 or 452) activation either via NFC or by scanning a barcode 460. Either the Static Data Chip 451 or Dynamic Data Chip 452 sources the requested NDEF or barcode data (461 or 462) which is relayed by the $3^{rd}$ Party POS Device 455 to the Central Site 454 and logged in the chip activation database 467.

After the consumer has purchased the NFC chip (451 or 452), he or she will attempt to extract the information from the chip via NDEF protocol by bringing a Consumer's Device 453 within close proximity of the NFC chip (451 or 452) thereby supplying both an excitation frequency and read request. At this point an application running on the Consumer's Device 453 parses the received data and begins the process of chip unlocking 468 or (optionally) if no appropriate application is present, the Consumer's Device 453 may automatically contact the appropriate application store on the Internet to download the required application 464.

Assuming the appropriate application is running on the Consumer's Device 453, the chip unlocking process 468 transmits the NFC chip's serial number to the Central Site 454, which receives the unlocking request 466, confirms that the associated chip has been purchased and paid for 467, and extracts the appropriate decryption key from its chip key database 470 passing the extracted decryption key back to the Consumer's Device 453 chip unlocking process 468. The Consumer's Device 453 chip unlocking process 468 uses the decryption key to decrypt the chip NDEF received ciphertext (e.g., 202 of FIG. 2A). Finally, the decrypted NFC chip data is then executed by the application 471 (FIG. 4B) running on the Consumer's Device 453.

To summarize the gaming application embodiment described above, a "game play platform" is created by the combination of an electronic computing device (e.g., a mobile phone) and an NFC chip. Thus, the overall system includes a plurality of such game play platforms. The various embodiments also include a "NFC chip unlocking system" which functions to identify NFC chips that are permitted to be unlocked (e.g., those that have been legitimately purchased). A database of unique NFC chip identifiers and their respective decryption key(s) are maintained. The NFC chip unlocking system receives unlocking requests from the electronic computing devices that includes an identifier of an NFC chip, and returns some or all of the decryption keys to the electronic computing device that requested them to allow the electronic computing devices to unlock the encrypted data in their associated NFC chips. In the embodiment that uses static NFC chips, the NFC chips themselves do not undergo any changes to their data. The NFC chips can be queried for data and can read out data, but no data is written to the NFC chips after they are initially programmed and commercially distributed. In this static NFC chip embodiment, neither chip activation nor data unlocking causes any changes to the NFC chip.

As discussed above, NFC chip activation and data unlocking are distinct, but related actions. In the retailer POS embodiment, NFC chip activation occurs when the consumer purchases the NFC chip. Chip activation is tracked in the database, such as by designating a state of the NFC chip as being either "activated" or "non-activated." If the NFC chip unlocking system receives a request from the electronic computing device to unlock an NFC chip that has an "activated" status, the appropriate decryption keys are returned to the electronic computing device. However, if the NFC chip unlocking system receives a request to unlock an NFC chip that has a "non-activated" status, the request is not fulfilled, and thus no decryption keys are returned. Data unlocking refers to activities performed in the electronic computing device that makes use of the decryption keys to unlock the encrypted data read out of the NFC chip.

As also discussed above, there are embodiments wherein the NFC chip is initially only partially activated, thereby allowing for only a portion of the cipher data in the NFC chip to be unlocked. In one such embodiment described above, credits from winning game plays may be used as payment for unlocking additional portions of the cipher data in the NFC chip.

In the retailer POS embodiment, the POS functions as a "payment processor" to identify an individual non-activated NFC chip and receive payment for a purchase of the individual non-activated NFC chip, and electronically communicate the purchase to the NFC chip unlocking system. However, in an alternative embodiment, the payment processors are the plurality of electronic computing devices themselves. In this embodiment, the electronic computing devices are configured to receive payment information for making the payment (e.g., credit card, debit card, or checking account information) and forward the payment information to a payment network for purchase approval. Upon payment approval, the electronic computing device initiates communication with the NFC chip unlocking system to update the status of the NFC chip (or a portion of the NFC chip) to an "activated" status.

It should be appreciated by those skilled in the art that various modifications and variations may be made to the present invention without departing from the scope and spirit of the invention. It is intended that the present invention include such modifications and variations as come within the scope of the appended claims.

What is claimed is:

1. A system for unlocking game play data on Near Field Communications (NFC) chips to allow for game play using the game play data on the NFC chips, the system comprising:
(a) a plurality of electronic computing devices;
(b) a plurality of the NFC chips, each of the NFC chips coupled with a different one of the plurality of electronic computing devices to provide a plurality of secure stand-alone game play platforms, each of the plurality of NFC chips interacting with only the electronic computing device that it is coupled to, each of NFC chips including firmware configured to transmit to its respective electronic computing device:
(i) a unique identifier of the NFC chip in cleartext, and
(ii) game play data stored in the NFC chip, at least a portion of the game play data being encrypted and thereby transmitted in ciphertext;
(c) a NFC chip unlocking system communicatively coupled with the plurality of electronic computing devices, the NFC chip unlocking system including a database of NFC unique chip identifiers and one or more decryption keys associated with each of the NFC unique chip identifiers, the NFC chip unlocking system configured to:
   (i) receive individual NFC chip unlock requests from the electronic computing devices, the requests including the unique identifiers in cleartext of the respective NFC chips coupled thereto, and
   (ii) forward at least one of the decryption keys associated with the unique identifiers to the respective electronic computing device that initially generated the unlock request,
the plurality of electronic computing devices being configured to:
   (i) receive their respectively forwarded at least one decryption key from the NFC chip unlocking system,
   (ii) receive at least a portion of the encrypted game play data transmitted in ciphertext from the respectively associated NFC chip, and
   (iii) use the at least one decryption key to decrypt at least a portion of the game play data from the respectively associated NFC chip, thereby unlocking that portion of the game play data, and
   (iv) perform game play using the unlocked game play data from the respectively associated NFC chip,
   wherein the electronic computing devices and their respective NFC chips are configured to operate independently of the NFC chip unlocking system to provide a game play platform after the electronic computing devices receive their respectively forwarded decryption keys from the NFC chip unlocking system.

2. The system of claim 1 wherein the database in the NFC unlocking system further includes a status of the NFC chips, the status being activated or non-activated, the NFC chip unlocking system being further configured to forward the at least one of the decryption keys associated with the unique identifiers to the respective electronic computing device that initially generated the unlock request only when the status of the respective NFC chip is activated.

3. The system of claim 2 wherein the NFC chip is in an initial state of being non-activated, the system further comprising:
   (d) a plurality of payment processors configured to:
      (i) identify an individual non-activated NFC chip and receive payment for a purchase of the individual non-activated NFC chip, and
      (ii) electronically communicate the purchase to the NFC chip unlocking system,
   wherein the NFC chip unlocking system is further configured to change the database status of the purchased NFC chips from non-activated to activated, thereby allowing the NFC unlocking system to forward the at least one decryption key to the electronic computing device for the purchased NFC chips when individual chip unlock requests are received for the respective NFC chips.

4. The system of claim 3 wherein the plurality of payment processors are the plurality of electronic computing devices, the electronic computing devices being configured to receive payment information for making the payment and forward the payment information to a payment network for purchase approval.

5. The system of claim 2 wherein the plurality of payment processors are a plurality of retailer Point Of Sale (POS) terminals.

6. The system of claim 5 wherein the NFC chip is initially attached to retail packaging that includes a barcode which is associated with the cleartext unique identifier of the NFC chip, and wherein the Point Of Sale (POS) terminals identify the individual non-activated NFC chip using the barcode.

7. The system of claim 1 wherein the game play data is stored on the NFC chips in one more cipher text data blocks, each cipher text data block requiring a different decryption key to decrypt its game play data, and thereby allow for game play.

8. The system of claim 1 wherein one or more of the NFC chips has all of its game play data in only one cipher text data block that requires only one decryption key to decrypt all of its game play data.

9. The system of claim 1 wherein one or more of the NFC chips has its game play data stored in a plurality of different cipher text data blocks, each cipher text data block requiring a different decryption key to decrypt its game play data, and wherein the NFC chip unlocking system is further configured to initially forward the decryption key for only one of the cipher text data blocks, thereby allowing game play for only the game play data in that cipher text data block, and wherein the game play allows for monetary credits to be established for winning game play, the NFC chip unlocking system being further configured to:
   (iii) receive subsequent NFC chip unlock requests from the electronic computing devices for their associated NFC chips that have their game play data stored in a plurality of different cipher text data blocks,
   (iv) receive any monetary credits established for winning game play from the electronic computing devices for their associated NFC chips,
   (v) forward one or more additional decryption keys to the respective electronic computing devices when sufficient monetary credits are available,
the plurality of electronic computing devices being further configured to:
   (v) receive their respectively forwarded one or more additional decryption keys from the NFC chip unlocking system, the one or more additional decryption keys being used to decrypt additional portions of the game play data from the respectively associated NFC chip, thereby unlocking those additional portions of the game play data to allow for game play using the unlocked additional portions.

10. The system of claim 1 wherein at least a portion of the plurality of NFC chips are static memory chips.

11. The system of claim 1 wherein at least a portion of the plurality of NFC chips are dynamic memory chips.

12. The system of claim 1 wherein the portion of the game play data that is encrypted is encrypted using a symmetrical encryption algorithm.

13. The system of claim 1 wherein the portion of the game play data that is encrypted is encrypted using an asymmetrical encryption algorithm.

14. The system of claim 1 wherein a Cyclic Redundancy Check (CRC) is computed for the portion of the game play data that is encrypted, the CRC also being transmitted in ciphertext with the game play data, the electronic computing devices using the transmitted CRC's to check the decrypted game play data.

* * * * *